(12) United States Patent
Shinoda

(10) Patent No.: US 7,001,276 B2
(45) Date of Patent: Feb. 21, 2006

(54) GAMING MACHINE AND SERVER THEREFOR

(75) Inventor: Tomohiro Shinoda, Tokyo (JP)

(73) Assignee: Aruze Corporation, Tokyo (JP)

( * ) Notice: Subject to any disclaimer, the term of this patent is extended or adjusted under 35 U.S.C. 154(b) by 0 days.

(21) Appl. No.: 10/644,082

(22) Filed: Aug. 20, 2003

(65) Prior Publication Data

US 2004/0106455 A1 Jun. 3, 2004

(30) Foreign Application Priority Data

Aug. 20, 2002 (JP) .............................. 2002-239691

(51) Int. Cl.
*A63F 13/00* (2006.01)

(52) U.S. Cl. ...................................... 463/25
(58) Field of Classification Search .................. 463/25, 463/40, 42–43
See application file for complete search history.

(56) References Cited

U.S. PATENT DOCUMENTS 6,616,535 B1 * 9/2003 Nishizaki et al. ............. 463/43

FOREIGN PATENT DOCUMENTS

| DK | 10000599 | 5/2001 |
|---|---|---|
| DK | 10060079 | 6/2002 |
| GB | 2 334 456 | * 8/1999 |
| JP | 9-56924 | 3/1997 |
| JP | 10-24145 | 1/1998 |
| JP | 11-114217 | 4/1999 |
| JP | 11-151371 | 6/1999 |
| JP | 2000-185132 | 7/2000 |
| JP | 2001-224816 | 8/2001 |
| JP | 2001-321569 | 11/2001 |
| JP | 2001-340527 | 12/2001 |
| JP | 2002-113255 | 4/2002 |
| JP | 2002-191856 | 7/2002 |
| JP | 2002-301252 | 10/2002 |
| JP | 2003-944 | 1/2003 |
| JP | 2003-945 | 1/2003 |
| JP | 2003-10388 | 1/2003 |
| JP | 2003-24513 | 1/2003 |
| JP | 2003-62321 | 3/2003 |
| JP | 2003-79932 | 3/2003 |
| JP | 2003-79956 | 3/2003 |
| JP | 2003-144726 | 5/2003 |
| JP | 2003-245410 | 9/2003 |
| JP | 2003-290542 | 10/2003 |

* cited by examiner

*Primary Examiner*—Kim Nguyen
(74) *Attorney, Agent, or Firm*—Antonelli, Terry, Stout & Kraus, LLP

(57) ABSTRACT

A gaming machine (10) and a server (1) for the gaming machine are provided. A game carried out with the gaming machine (10) that uses a token with built-in IC chip is characterized in that game initial data or game history data is read out from the token and the commencement or progress of the game is controlled based on the read out data and previously stored data.

19 Claims, 8 Drawing Sheets

GAMING MACHINE AND SERVER THEREFOR

CROSS-REFERENCE TO RELATED APPLICATIONS

This application is based upon and claims the benefit of priority from the prior Japanese Patent Application No. 2002-239691 filed on Aug. 20, 2002, the entire contents of which are incorporated herein by reference.

This application is related to a co-pending U.S. patent application entiled "Token With Built-In IC Chip," the application being filed on even date herewith. The co-pending applicatiion is expressly incorporated herein by reference.

BACKGROUND OF THE INVENTION

1. Field of the Invention

This invention relates to a gaming machine where a player may play a game using tokens and relates to the game played on the gaming machine. This invention also relates to a server for managing the game such that the server manages or monitors data used in the game.

2. Related Art

A recent game that is manufactured in Japan and supplied as a video game or an arcade game combines the latest hardware and software technology. A composite art or integrated industry of the game with an advanced graphic display technology for displaying characters, backgrounds, etc., and a sophisticated speculative method such as plot development is highly assessed not only in Japan but also around the world. A video game is a type of game to be played with a home video gaming machine or a portable gaming machine. An arcade game is a type of game that is played with an arcade video gaming machine installed in a game hall (so-called game arcade).

These kinds of games range widely and may include, for example, a racing game which displays simulatively a horse race or an auto race, a sports game which displays simulatively a baseball game or a football game, a story game in which a character moves freely in the predetermined region to obtain an item disposed on a map, and a fighting game in which a player may compete with a professional wrestling, boxing, sumo wrestling, judo, kendo (Japanese fencing), and other martial arts using swords or spears.

Recently, people especially enjoy a strategic simulation game among the provided video games.

In the strategic simulation game, the player controls a leader of a group such that the leader may direct a unit that belongs to the group and experiences a fictional strategy and combat in a virtual environment or space being deployed on a screen such as television screen.

In such strategic simulation games, the player controls, for example, a character of Oda Nobunaga (a leader of a group) who governs a country called the Owarino-kuni (Owari region), organizes military commanders (a head of the unit belonging to the group) to be his followers, develops his own military group by utilizing a military draft and training, battles and defeats an opponent group (opponent group) led by another feudal lord such that he may expand his own territory and finally unify the country during a fictional Japanese Warring States Period.

As described above, the player as the leader of the group in the strategic simulation game can battles an opponent by ordering the unit belonging to the group under various strategies. The player can gain various experience as the leader of the group and commanders of the units such that the player easily enjoy virtual strategies and battles.

Generally, the strategic simulation game requires several or several tens of hours in order to accomplish the final purpose. Many players devote themselves to the game over a long period of time enjoying virtual strategies and battles. In this respect, the strategic simulation game is significantly different from that in another category including an action game, a shooting game, a puzzle game, etc.

On the other hand, the arcade game is often elaborated. For instance, a music game for the player to actually dance or play instruments to a rhythm, an airplane simulation game utilizing a mock pilot's seat in the plane cockpit, and so on are quite popular such that some of them may become a boom in the society. The token game having been widely spread, however, still remains popular among the arcade games.

In the token game, the player purchases one or more tokens from a token inscription machine such that the player starts the token game with the gaming machine by inserting the token. If the player wins the game, a predetermined number of tokens are paid out. So, the player who has obtained many tokens through this can enjoy the game again without purchasing a new token.

In such typical token game as a roulette, card games, a horse racing, etc., the way to use tokens is quite simple. Therefore, it is not easy to provide the player with a novel sensation or surprise and it may become difficult to attract more and more players and to make the token game so popular as to make a boom.

In addition, a recent gaming machine that utilizes tokens has been provided such that a plurality of players can simultaneously play a horse racing game including a breeding mode and a racing mode. In the breeding mode of such horse racing game the plurality of players can, for example, breed and train virtual horses owned by the players by inserting tokens and the virtual horses owned by the players can be made to run a race while the players may buy betting tickets for each race by inserting tokens so that the players can receive tokens in accordance with race results. In the gaming machine utilizing tokens that provides the breeding mode and racing mode as described above, however, tokens are paid out in accordance with the result of each race and the number of tokens paid out is not closely related to the content of the game. In this regard, such gaming machine utilizing tokens that provides the breeding mode and racing mode does not essentially differ from a conventional game utilizing tokens and, Therefore, it is difficult for such gaming machine to attract new players as a gaming machine utilizing tokens where an innovative idea is introduced and implemented.

Thus, a gaming machine utilizing tokens where an innovative idea is introduced and implemented is in demand and a strategic simulation game provided by the gaming machine utilizing tokens that allows a plurality of players to play at the same time is under development in order to fulfill such demand. In the case where such strategic simulation game is provided by the gaming machine utilizing tokens, the player can play a strategic simulation game at the game arcade and, in addition, it becomes possible for players to easily compare groups of characters that have been bred or reinforced by the players and to make the groups of characters that have been bred or reinforced by the individual players compete with each other. Therefore, a new type of gaming machine utilizing tokens can be provided so that the skills of the players become important in a manner different from the conventional gaming machine utilizing tokens.

Furthermore, a token with an IC chip built in or incorporated is under consideration so that the token with built-in IC chip, used in the gaming machine, may store data (for example, data concerning groups of characters, data concerning units that belong to the groups, etc.) used with the strategic simulation game. In such a case it becomes possible for tokens (tokens with built-in IC chip) to obtain a new kind of value that has not conventionally existed so that the player can develop an emotional attachment to the player's token. In addition, information concerning the process of the game can be stored in a token with built-in IC chip while the game is in progress and, thereby, it becomes possible for the player to arbitrarily interrupt play and to resume the game that was once interrupted.

In particular, since a long period of time is required to achieve the final objective of the strategic simulation game as described above, the player may hesitate to start the game. Thus, it becomes possible to attract new players if the player may arbitrarily stop the game at any time and resume the game that was once interrupted and stopped.

A player who has played a game with a token with built-in IC chip on a gaming machine installed in a game arcade (first arcade) may not want to stop the game in the middle of it and resume the game with the same gaming machine. The player might rather resume the game in another game arcade (second arcade) with the token with built-in IC chip having been utilized in the first game arcade. If the gaming machine in the second game arcade does not recognize the player as the one who would like to resume the game, it may be difficult to attract such player by introducing such gaming machine.

In addition, since the player may keep the token with built-in IC chip where data used for the strategic simulation game is stored, there is a risk that the player may unfairly modify the data for the purpose of gaining an advantage in the game. If the gaming system allows such action, other players who have been playing the game according to the rules may feel that they have not been treated fairly or have been cheated such that they may feel displeasure leading to a risk that they may quit playing the game.

SUMMARY OF THE INVENTION

According to this invention, a gaming machine or a server for managing a game may be provided such that it enables a game arcade to attract new players. Thus, a profit can be made through the introduction of such gaming machine. The gaming machine may also allows players to concentrate on and enjoy the game without feeling that they have been treated unfairly and without feeling displeasure.

According to this invention, a gaming machine is characterized in that the gaming machine may transmit outside game initial data as well as game history data that is read out from a token with built-in IC chip. In addition, according to this invention, a server for managing the game is characterized in that the server obtains and stores the game initial data as well as the game history data being read out at the gaming machine.

Here, the token in this specification and the claims may be used as a medal such that either medal or token may be used with the gaming machine according to this invention.

More concretely, according to this invention, the following may be provided.

(1) a gaming machine comprising:
  data reading means for reading out game initial data as well as game history data from a token with built-in IC chip; and
  data transmission means for transmitting the game initial data as well as game history data having been read out by the above described data reading means to the outside.

As described above, the game initial data as well as game history data that have been read out from the token with built-in IC chip are transmitted to the outside (server, or the like, for managing the game that has been installed in a game arcade, for example) and, therefore, it becomes possible for the manager of the game arcade to recognize at an early stage whether or not the token with built-in IC chip used for the game has been used in another game arcade as well as whether or not the data stored in the token with built-in IC chip has fraudulently been modified. Accordingly, it becomes possible for the manager of the game arcade to quickly respond to the player who is playing the game using such token with built-in IC chip. Therefore, it is prevented that tokens with built-in IC chip which have been used in other game arcades and tokens with built-in IC chip in which modified data has been stored can be utilized.

As a result, it may become possible for the game arcade to attract new players and a profit can be made through the introduction of such gaming machine and, furthermore, players can concentrate on and enjoy the game without feeling that they have been treated unfairly and without feeling displeasure.

Here, the gaming machine may include the gaming machine and the data reading means may include an information reading device. The data transmission means may include data transmission unit. The data transmission unit may comprises an interface circuit and a communication line.

Furthermore, according to this invention, the following may be provided.

(2) The gaming machine according to (1), comprising: stop signal reception means for receiving a stop signal in order to stop the commencement or progress of the game; and game stop means for stopping the commencement or progress of the game based on predetermined game initial data or game history data according to the above described stop signal.

According to (2) of this invention, a stop signal may be transmitted from the outside when the token with built-in IC chip having been used with another gaming machine in another game arcade or the token with built-in IC chip having unfairly-modified data stored is utilized with the gaming machine such that the commencement or progress of the game based on the game initial data or the game history data that has been stored in the token with built-in IC chip with the gaming machine can be stopped so as to stop the game by using such token with built-in IC chip.

As a result, it becomes possible for the game arcade to eliminate the player who bought the token in the another game arcade and wants to resume the game with the gaming machine in the game arcade. Therefore, the system may attract new players who want to start the game in the game arcade more easily. In addition, a sufficient profit can be made through the introduction of the gaming machine. Furthermore, the players can concentrate on and enjoy the game without feeling that they have been treated unfairly and without feeling displeasure.

On the other hand, it also becomes possible for the game arcade to have the player who bought the token in the another game arcade and wants to resume the game with the gaming machine in the game arcade if the another arcade is one of the affiliated game arcades. Therefore, the system may attract new players who want to start and resume the game in one of the game arcade where the player wishes to play the game.

Here, the stop signal reception means may include a stop signal reception unit. The stop signal reception unit may comprise an interface circuit and a communication line. The game stop means may include a game stop unit. The game stop unit may comprise a CPU or a computer, a communication line, and an actuator such as relay.

The stop signal may be transmitted depending on a degree of difference between pre-recorded data and the game initial data or the game history data. Therefore, it may be transmitted if the pre-recorded data is far from the game initial data or the game history data. The degree may be adjusted to recognize the differences between them such that only identification data is compared or that the entire data is compared.

Furthermore, according to this invention, the following may be provided.

(3) A server for managing a game used in a computer network configured so as to include one or more gaming machines that utilize tokens provided with data reading means for reading out game initial data or game history data from a token with built-in IC chip, the server comprising: data acquisition means for acquiring the game initial data or the game history data that has been read out by the data reading means of the above described gaming machine; and data storage means for storing the game initial data and game history data acquired by at least the above described data acquisition means.

According to (3) of the invention, the game initial data and game history data stored in the token with built-in IC chip can be acquired via the gaming machine and can be stored. Therefore, it is possible based on the data thereof for the manager of the game arcade to recognize at an early stage whether or not the token with built-in IC chip used for the game was once used in another game arcade as well as whether or not the data stored in the token with built-in IC chip has unfairly or fraudulently been modified. Accordingly, it becomes possible for the manager of the game arcade to quickly respond to the player who is playing the game using such token with built-in IC chip so that the manager may prevent the token with built-in IC chip that was used in another game arcades or the token with built-in IC chip in which unfairly-modified data was stored from being utilized.

As a result, it becomes possible for the game arcade to attract new players and a profit can be made through the introduction of such gaming machine and, furthermore, players can concentrate on and enjoy the game without feeling that they have been treated unfairly and without feeling displeasure.

Here, the data acquisition means may include a data acquisition device such as interface device and a converter. The data storage means may include a storage device such as memory, magnetic disk, electromagnetic disk, optical disk, and so on.

(4) The server for managing the game according to the above described (3) further comprises: data comparison means for comparing the game initial data and game history data acquired by the above described data acquisition means with the data stored by the above described data storage means previously; and game stop signal transmission means for transmitting a stop signal in order to stop the commencement or progress of the game based on the game initial data or the game history data acquired by the above described data acquisition means to the above described gaming machine in the case that identification data included in the game initial data or the game history data acquired by the above described data acquisition means does not coincide with the data previously stored by the above described data storage means as a result of the comparison by the above described data comparison means.

According to (4) of the invention, the game initial data or the game history data acquired from the token with built-in IC chip is compared with the data stored previously. As a result of the comparison, a stop signal is transmitted to the gaming machine in the case that the acquired game initial data or the game history data does not coincide with the data stored previously so that the commencement or progress of the game based on the game initial data or the game history data is stopped. Therefore, the token with built-in IC chip that has been used in another game arcade or the token with built-in IC chip in which unfairly-modified data was stored can be prevented without fail from being utilized.

As a result, it becomes possible for the game arcade to more reliably attract new players and a sufficient profit can be made through the introduction of the gaming machine and, furthermore, the players can concentrate on and enjoy the game without feeling that they have been treated unfairly and without feeling displeasure.

Here, the data comparison means may include a data comparing unit. The data comparing unit may comprise a CPU or a computer, a memory, and a data communications line. The game stop signal transmission means may include a stop signal transmission unit. The stop signal transmission unit may comprise a transmission device and a data communication line.

The gaming machine may be a gaming machine provided with a token insertion slot for inserting tokens and a token payout outlet for paying out tokens. The gaming machine may also be a gaming machine where a player inserts a token into the above described token insertion slot so as to play a game and where tokens may be paid out from the above described token payout outlet as a result of the actions of the player. It is also possible to insert a token into the above described gaming machine while the game is in progress.

Here, it is possible for one player, alone, to play a game on the above described gaming machine and it is possible for a plurality of players to simultaneously play the game. In addition, the above described gaming machine is provided with as many satellites as the number of players that can simultaneously play the game on the gaming machine.

The satellite in this specification refers to a device that allows the game to proceed. Specifically, the device comprises: a control unit including one or more control buttons or levers or knobs that a player controls them to input a predetermined instruction; and an image display device for displaying images concerning the game, wherein the game displayed on the gaming machine proceeds in accordance with the operation of the above described control unit by the player while the player views images displayed on the above described image display device.

In the gaming machine according to this invention, the number of satellites is not limited. The number can be set any numerals depending on the size of the gaming machine, the nature of the game, and so on.

The token denotes a substance that enables the player to play the game with the gaming machine by inserting the substance into the gaming machine according to this invention. The substance generally is formed into a token shape or an imitated token. The above-mentioned token may be different from the token as a currency circulating in the real society. The above-mentioned token may be purchased, for example, through a token inscription machine installed in a game hall or a game arcade. The token obtained by a game result generally may not be exchanged for money or goods.

The number of tokens inserted into the gaming machine according to this invention, for example, may be stored as the game point in a storage media (for example a RAM, a flash memory, etc) built in the gaming machine and/or the token with built-in IC chip placed or set at a predetermined position of the gaming machine. On the other hand, when the player controls the control unit to input a predetermined instruction, the same number of tokens may be paid out as corresponding to the number of the stored points.

In this specification, the point used herein refers to information about the game that is equivalent to the number of the tokens so that the player may play the game by inputting such information into the above-mentioned gaming machine. For example, if the game can be started by inserting ten tokens into the gaming machine according to this invention, the game can also be started by inputting ten points instead of ten tokens.

The token with built-in IC chip refers to a first kind of token or a token with an incorporated IC chip being used with the above-mentioned gaming machine or a token having a storage section that can store the game initial data as well as the game history data supplied by the above-mentioned gaming machine. The conventional token may refer to a second kind of token such that the conventional token may not have a data storage section or device.

In the gaming machine according to this invention, the player can use one or more tokens with built-in IC chip to play the game.

The above-mentioned storage section may be composed of, for example, an EPROM (Erasable Programmable ROM), an OTPROM (Optical Programmable ROM), an EEPROM (Electrically Erasable Programmable ROM), a flash memory (flash EEPROM), and so on. In addition, the token with built-in IC chip may be provided with, for example, a microcomputer having a CPU (central processing unit), a DRAM (dynamic random access memory), a mask ROM, as well as a control gate array that renders a function of an interface circuit, and the like, in addition to the above described storage section. In this specification, that the data is stored in the storage section of the token with built-in IC chip refers to that the data is stored in the token with built-in IC chip unless it is otherwise indicated.

A shape of the above-mentioned token with built-in IC chip is not limited. But the token with built-in IC chip is preferably disk-shaped so that the token with built-in IC chip is recognized without a sense of discomfort. It is desirable that the size and thickness of the above-mentioned token with built-in IC chip are substantially the same as those of the ordinary token.

Material of the above-mentioned token with built-in IC chip is not limited, resin can be used, for example. The token may be made of metal if the IC chip or pins thereof are coated with resin or the like so that insulation of the embedded IC chip and pins thereof to each other is secured.

The game initial data in this specification may include data required for commencement of the game of the above described gaming machine from among data stored in the token with built-in IC chip before the token is used in the gaming machine. The above described game initial data includes, for example, data concerning characters (units) controlled by the player, data concerning the above described points, data concerning initial settings carried out at the time of commencement of the game, and the like. In addition, the identification data described below may also be included in the above described game initial data.

In this specification, the game history data indicates data concerning the game in progress in the above described gaming machine. The above described game history data includes, for example, data concerning characters (units) controlled by the player, data concerning the above described points. In addition, the identification data described below may also be included in the game history data in the same manner as the above described game initial data.

In this specification, the identification data may refer to data assigned to an individual player, to a token with built-in IC chip, and to a game arcade (game centers). The identification data is stored in the above described token with built-in IC chips. In addition, for example, an ID code or check code for identifying the player, personal information of the individual player, and data concerning initial settings carried out at the time of commencement of the game may be referred to as the data assigned to each player.

It is desirable for the above described token with built-in IC chip to be integrally configured with a design of a three-dimensional form. Since the design having a three-dimensional form (it maybe referred to as "action figure" hereinafter.) resembles the appearance of the character in the game so that the emotional attachment of the player to the token (token with built-in IC chip) is enhanced so that a desire to collect tokens can be further increased. Therefore, it may be possible to encourage the player to devote himself or herself to the game even more. Here, it is not necessary that the token with built-in IC chip is configured so integrally with the action figure that the action figure may be fixed firmly and cannot be removed. The action figure may be configured so as to be detachable from the token, which has a token or disk shape. Here, the token with built-in IC chip configured so as to be integrated with an action figure is described below in detail in reference to the drawings.

In the gaming machine of this invention although the above described tokens with built-in IC chip may be used in place of the ordinal or conventional token, it is desirable for the above described tokens with built-in IC chip to be used together with the ordinal or conventional tokens.

The token with built-in IC chip that stores data concerning game characters and the conventional token can be simultaneously used. Therefore, it becomes possible to simultaneously utilize different tokens of different values so that it becomes possible to provide a very interesting game such that different tokens including either conventional token or token with built-in IC chip can be paid out depending on, for example, the situation of the game in progress.

In addition, it is desirable for the gaming machine of this invention to output the above described tokens with built-in IC chip in response to the predetermined conditions that have been satisfied in the game in progress.

When predetermined conditions are satisfied during the game in progress, tokens with built-in IC chip can be paid out, so that the desire of the player to collect tokens (tokens with built-in IC chip) can be further enhanced and it becomes possible to further encourage the player to devote himself or herself to the game. The predetermined conditions are not particularly limited, but for example it may include a condition that one group of the player defeats another group in a battle can be cited.

In this specification, the simulation game herein may refer to one game category and be defined with a common concept in the art. For instance, the simulation game may be a game in which the player can enjoy a virtual world with a virtual environment and/or a virtual space provided.

The strategic simulation game may refer to a game, among the above-mentioned simulation games, in which the player can experience and enjoy, especially, virtual strategies and battles in the virtual environment and virtual space provided (referred to "virtual environment" hereinafter).

The gaming machine according to this invention may preferably be a gaming machine for supplying a strategic simulation game. The above-mentioned token with built-in IC chip according to this invention is preferably used for the gaming machine to supply the strategic simulation game.

In general, the strategic simulation game has a larger number of characters that appear on the game and can be controlled by the player than that in another game category does. By storing data of different characters in as many tokens with built-in IC chip, the player can collect a plurality of tokens with built-in IC chip with different values and play the game with so many tokens with built-in IC chip.

As a result, the desire for collection of tokens (tokens with built-in IC chip) is enhanced significantly so that the gaming machine may increase the amusement of the game.

In this specification, the group used herein is a virtual group (military group) that can be controlled by the player in the virtual environment or the like and that is provided by the above-mentioned strategic simulation game. The group is composed of a leader and a unit described later. For example, if the strategic simulation game adopts the Japanese territory in the Warring State Period as a virtual environment, the above-mentioned group may include a military group led by the famous feudal lords such as Oda Nobunaga, or Takeda Shingen, or the like.

If the strategic simulation game adopts a modern war as a virtual environment, the above-mentioned group may include a military force such as a tank, a warship, and a fighter airplane.

The unit in this specification refers to one unit to constitute the above-mentioned group. The above-mentioned group is composed of one or more units. For example, if above-mentioned group is an army (or military group) led by Oda Nobunaga, the group is composed of an army unit led by Hashiba Hideyoshi and Hashiba Hideyoshi himself, and so on. If the above-mentioned group is a military force including tanks, battleships and battle planes, the unit configuring the group includes tanks, battleships and battle planes. The leader refers to a head of the unit among the above-mentioned units. For example, if the above-mentioned group is an army group led by Oda Nobunaga, the leader is Oda Nobunaga himself.

The above-mentioned group, unit, and leader may have various capability values in various items, respectively. The capability values vary depending on conditions of the strategic simulation game in progress. The data concerning the group, unit, and leader may include data concerning such capability values. The data concerning the group, unit, and leader are stored in the token with built-in IC chip as the initial or the history data of the game.

One token with built-in IC chip may store data concerning the entire group, or data concerning one or more units belonging to the group. However, one token with built-in IC chip preferably stores data concerning one unit belonging to one group in consideration of an increase of desire for the player to collect such tokens.

In addition, transmission of game initial data and game history data to the outside may refer to transmission of the game initial data and game history data having been read out from the token with built-in IC chip to a machine or device such as a server for managing the game installed in the game arcade that can communicate with the gaming machine according to this invention.

Here, according to this invention, it is desirable for the gaming machine to stop the commencement or progress of the game based on the predetermined game initial data or game history data according to the stop signal, which is described below, when such stop signal is received. Thus, at an early stage of the game commencement or the game progress, it is possible to stop the player's using the token with built-in IC chip that was used in another game arcade or the token with built-in IC chip in which modified data was stored. As a result, it becomes possible for the game arcade to more reliably attract players and a profit can be made through the introduction of the gaming machine and, furthermore, players can concentrate on and enjoy the game without feeling that they have been treated unfairly and without feeling displeasure.

In this specification a "stop signal" may refer to a signal for stopping the commencement or progress of the game based on the predetermined game initial data or game history data. Accordingly, the commencement or progress of the game based on the designated game initial data or game history data is stopped by such stop signal with the gaming machine that has received the above described stop signal. According to this invention, the gaming machine may communicate with the server for managing the game via the Internet, LAN (local area network), or the like by means of wire or wireless communication.

In this specification, the server for managing the game may refer to a server used in a computer network configured to include one or more gaming machines that utilize tokens installed in the game arcade and wherein the server manages and/or monitors the data of the game and/or the game itself being played at the gaming machine. According to this invention, the server for managing the game retrieves via the gaming machine and stores the game initial data and/or game history data having been stored in the token with built-in IC chip.

Here, according to this invention it is desirable for the server for managing the game to compare the game initial data (or the game history data) retrieved from the token with built-in IC chip having stored the data beforehand. As a result, the stop signal is transmitted to the gaming machine so as to stop the commencement or progress of the game based on the game initial data (or the game history data) when the retrieved game initial data (or the game history data) does not coincide with the data stored in the gaming machine or the server beforehand.

Therefore, it may be prevented that the token with built-in IC chip having been used in another game arcade or the token with built-in IC chip in which modified data has been stored is utilized. As a result, it may be possible for the game arcade to more reliably attract new players and a sufficient profit can be made through the introduction of the gaming machine and, furthermore, players can concentrate on and enjoy the game without feeling that they have been treated unfairly and without feeling displeasure.

In this specification, the computer network may refer to a communication network where one or more computers are connected to each other so that software and hardware resources may work together in a cooperative manner for the purpose of sharing such hardware and software.

In addition, according to this invention, although the computer network including the server for managing the game includes the above described gaming machine, another device may be included or incorporated. A token dispenser or a token inscription machine for the token with built-in IC chip, for example, may write the game initial data on the token with built-in IC chip and pay out the token with built-in IC chip as the another device to be included.

In addition, machines and devices being composed of the above described computer network are under a condition where transmission and reception (i.e., communication) of data or of programs among the machines and devices are enabled. However, the machines and devices are not necessarily connected to each other by cables, wires, or the like. They may be connected to each other via transmission paths such as wireless communication.

In addition, according to this invention, one or more gaming machines being installed in the game arcade according to this invention, and the server for managing the game that is connected to the gaming machines via communication lines according to this invention may constitute a server system for managing the game that may manage or monitor the data used in the game or the game itself being played with the gaming machines.

The server system for managing the game allows each gaming machine to transmit the game initial data and/or game history data having been read out from the token with built-in IC chip to the server for managing the game. Therefore, it is possible for the manager of the game arcade to check at an early stage of the game whether or not the token with built-in IC chip used for the game was used in another game arcade as well as whether or not the data stored in the token with built-in IC chip was fraudulently modified if such token with built-in IC chip is installed in one of the gaming machines in the arcade. Accordingly, it becomes possible for the manager of the game arcade to quickly respond to the player who is playing the game using such token with built-in IC chip. Therefore, it may be prevented that the token with built-in IC chip having been used in another game arcade and the token with built-in IC chip in which modified data has been stored is utilized with the gaming machine.

Further features of the invention, its nature, and various advantages will be more apparent from the accompanying drawings and the following detailed description of the invention.

DETAILED DESCRIPTION OF THE INVENTION

Figure 1:
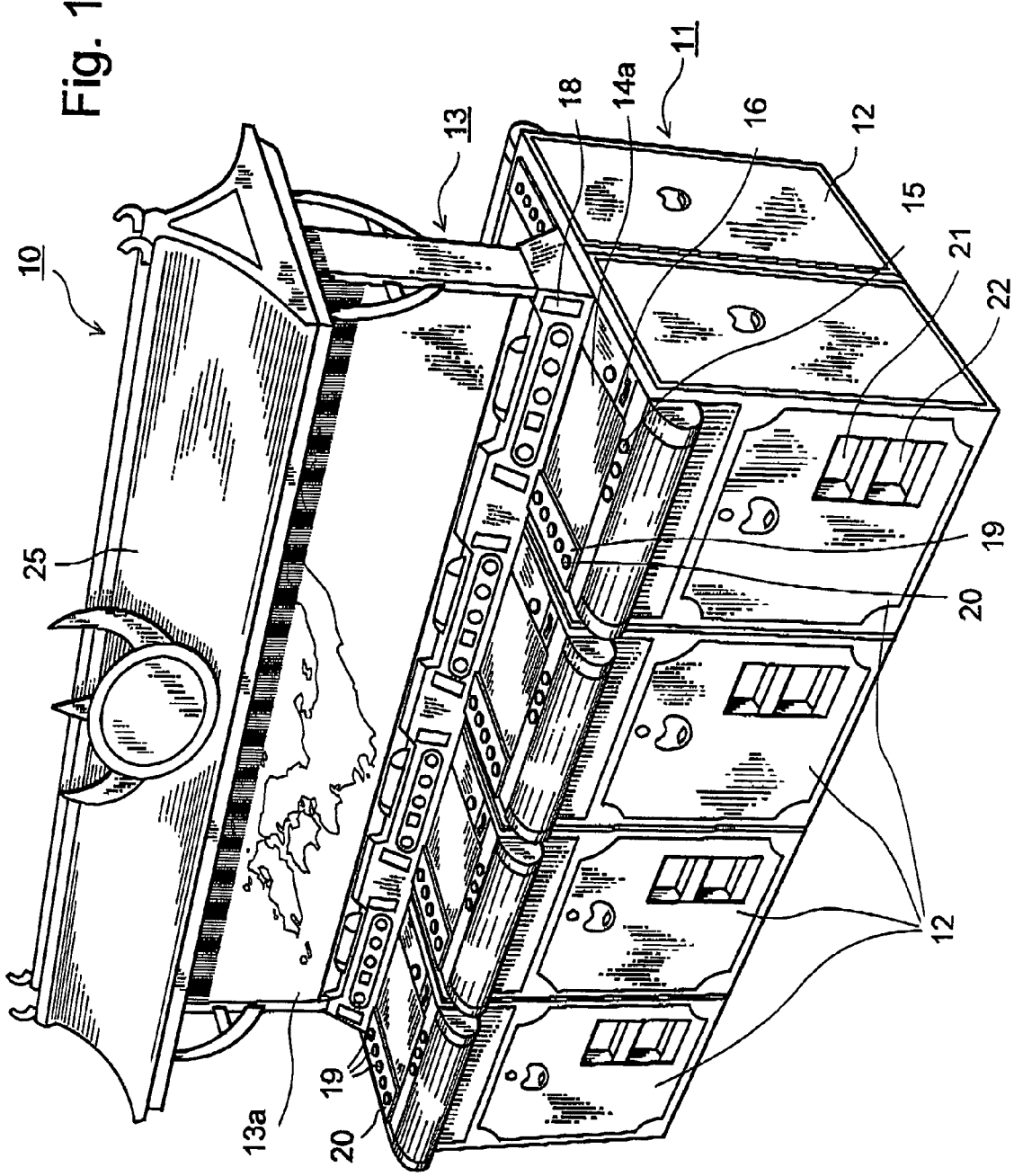
FIG. 1 is a perspective view of a gaming machine according to an embodiment of this invention.
Figure 2:
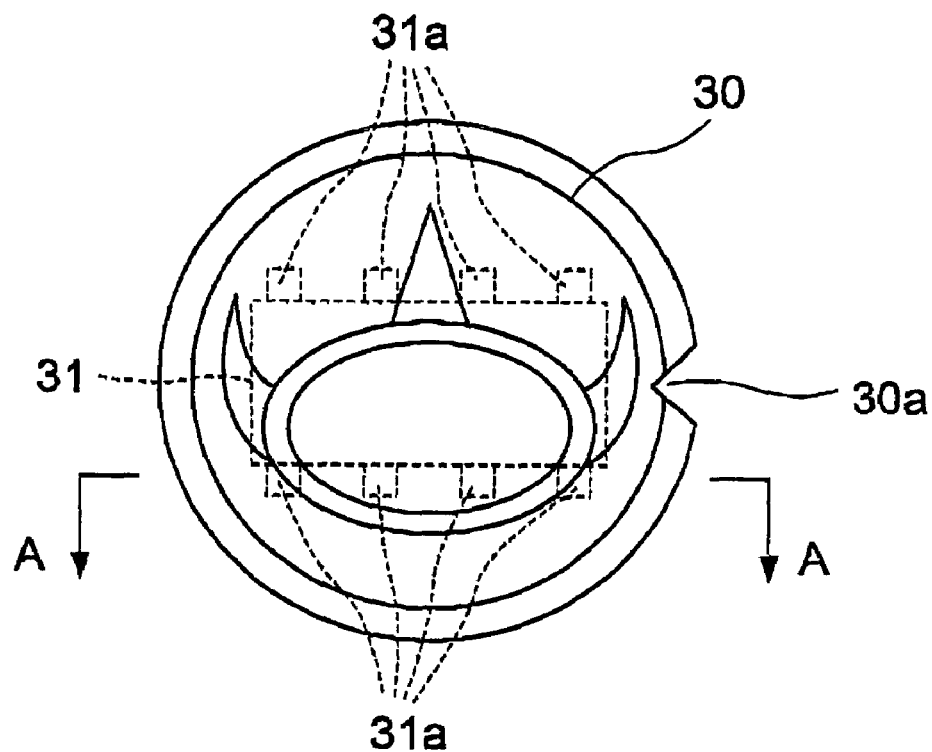
FIG. 2A is a plan view of a token with built-in IC chip according to an embodiment of this invention.
FIG. 2B is a cross sectional view along line A—A in FIG. 2A.
Figure 2:
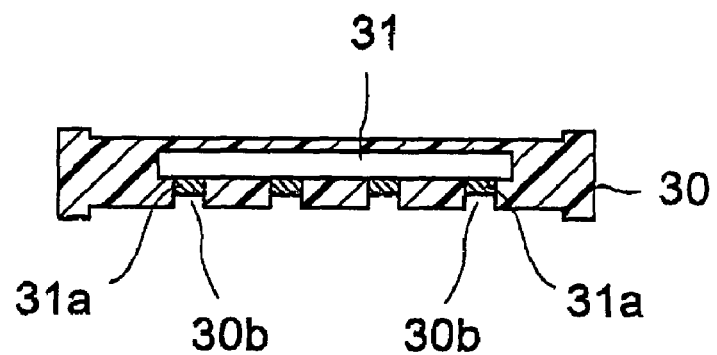

The embodiments of this invention are described below by referring to the drawings.

In the following, a gaming machine for providing a strategic simulation game is described. In the game, virtual battles and strategies may be carried out in a virtual environment such as Warring States Period of Japan environment. Here, data concerning one leader of one group or units which constitute the one group is supposed to be stored in one token with built-in IC chip.

FIG. 1 shows a perspective view of a gaming machine 10 according to an embodiment of this invention. The gaming machine 10 is provided with a main body device 11 composed of eight satellites 12 with four of them aligned in the front and the other four aligned in the rear, as shown in FIG. 1, so that up to eight players can play a strategic simulation game on the gaming machine 10.

A large display device 13 having screens 13*a* on the front side and the rear side, respectively, is installed vertically between the four front satellites 12 in a line and the four rear satellites 12 in a line such that the large display device 13 sticks out above the top surface of the main body device 11. Large images concerning the game may be displayed on the screens 13*a* of the large display device 13 and, therefore, people other than the players who are playing the strategic simulation game at the respective satellites 12 can also observe the strategic simulation game that is being carried out on the gaming machine 10. In addition, a roof 25 that imitates a portion of a castle in the Japanese Warring States Period is installed above the large display device 13.

An image display device 14 (not shown) is provided to each satellite 12, which constitutes the main body device 11 so that each screen 14*a* of the image display device 14 of each satellite 12 is set exposed to the outside at the center of the top surface of the satellite 12 such that a variety of images concerning the game as the game proceeds are displayed on the screen 14*a*. In addition, it is not necessary that the same images are displayed on the all screens 14*a* of the image display devices 14 provided in the respective satellites 12. It would rather be likely that images differing from each other are displayed on the screens 14*a* in accordance with the status of the game in progress.

A control unit 15 composed of a plurality of control buttons is provided on the front side of the screen 14*a* of the satellite 12 so that the player can control the plurality of control buttons (control unit 15) while the player is viewing the images displayed on the screen 14*a* so as to continue the game.

A token insertion slot 16 is provided on the right side of the screen 14*a*. A token sensor 120 (FIG. 4B) is provided inside the token insertion slot 16 so that the token that has been inserted into the token insertion slot 16 is detected by token sensor 120.

Figure 3:
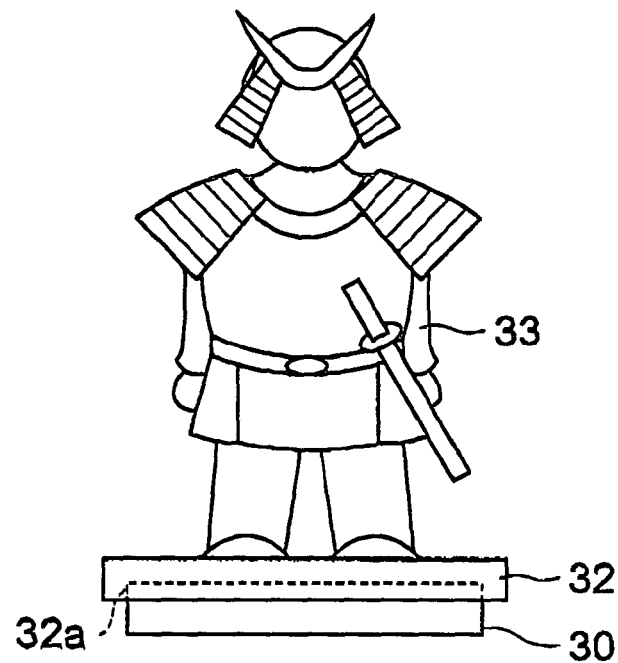
FIG. 3A is a front view of a token with built-in IC chip according to an embodiment of this invention. The token is integrally formed with a three-dimensional action figure.
FIG. 3B is a perspective view of a token receiving unit of a gaming machine with the token with built-in IC chip in FIG. 3A installed on a support of the token receiving unit for installation according to an embodiment of this invention.
Figure 3:
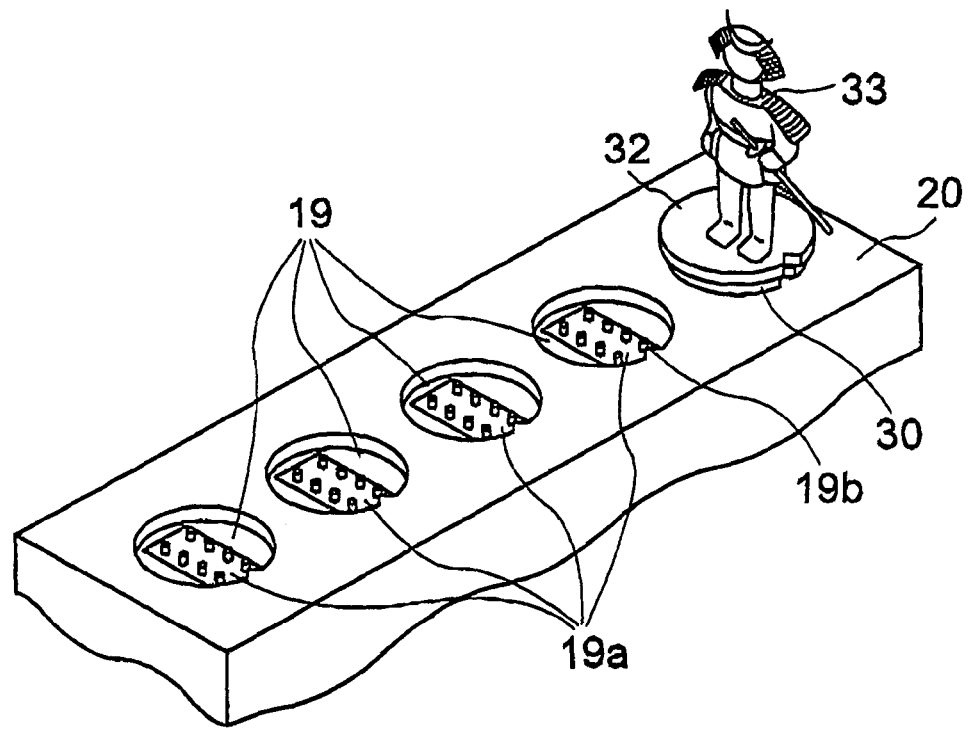

A support 20 for the installation of one or more tokens with built-in IC chip that has five recesses 19 into which tokens with built-in IC chip may be engaged is provided on the left side of screen 14*a*. In addition, connectors 19*a* (FIG. 3B) are provided at the bottoms of the recesses 19 so that connectors 19*a* are connected to an information reading/ writing device 112 installed inside satellite 12. This information reading/writing device 112 can read out the game initial data and game history data from the tokens with built-in IC chip that have been installed in some of the recesses 19 via the connectors 19a and, in addition, it is also possible to write the game initial data and game history data into the tokens with built-in IC chip. Accordingly, each player can simultaneously use at most five tokens with built-in IC chip in order to play the strategic simulation game.

A speaker 18 is provided in the back of screen 14a so that background music (hereinafter referred to BGM), speech sound, sound effects, and the like, can be appropriately emitted in accordance with the status of the strategic simulation game in progress.

A token payout outlet 21 for paying out ordinary tokens and an outlet 22 for paying out tokens with built-in IC chip are provided on the front of each satellite 12.

Although the inside of the satellite 12, in which the token payout outlet 21 is provided, a hopper 121 (FIG. 4B) and a token detection unit 122 (FIG. 4B) are provided therein (not shown in FIG. 1). When an instruction that tokens be paid out is transmitted and input from the control unit 15, tokens are paid out from the hopper 121 and the paid out tokens are detected by the token detection unit 122. After that, when the token detection unit 122 detects a predetermined number of metals, the payout of tokens from the hopper 121 is completed.

In addition, the outlet 22 for paying out tokens with built-in IC chip is composed of an opening through which tokens with built-in IC chip are paid out. Although the inside of satellite 12 is not shown in FIG. 1, the outlet 22 for paying out tokens with built-in IC chip is provided inside. An information writing device 113 that can write data onto the token with built-in IC chip and a built-in-IC-chip-token-payout device 114 for paying out tokens with built-in IC chip from the outlet 22 for paying out tokens with built-in IC chip are also provided inside satellite 12. The tokens with built-in IC chip have data written onto by means of the information writing device 113.

Next, a token with built-in IC chip used for the above described gaming machine 10 is described in reference to FIG. 2A through FIG. 3B.

FIG. 2A is a plan view schematically showing the above described token with built-in IC chip and FIG. 2B is a cross sectional view along line A—A in FIG. 2A.

A token with built-in IC chip 30 is approximately disk-shaped and an ornament (so-called relief) in a shape of a helmet (Japanese war helmet) from the Warring States Period is formed on the top (or head) face of the token with built-in IC chip 30, as shown in FIG. 2A. A notch 30a for positioning the token 30 is provided in a portion of the periphery of the token with built-in IC chip 30.

In addition, an IC chip 31 having eight pins 31a is embedded inside the token with built-in IC chip 30 as shown with dotted lines. This IC chip 31 is provided with a storage section (not shown) that can store the game initial data and game history data provided by the gaming machine 10.

As shown in FIG. 2B, eight openings 30b are provided on the tail (or bottom) face of the token with built-in IC chip 30 and eight pins 31a of the IC chip 31 are exposed to the outside through the openings 30b.

This token with built-in IC chip 30 is put in one of recesses 19 of a support 20 for token with built-in IC chip installation as shown in FIG. 3B so that the token with built-in IC chip 30 is engaged with the gaming machine 10 and connectors 19a provided at the bottom of one of the recesses 19 can make contact with pins 31a of the IC chip 31 embedded in the token with built-in IC chip 30.

As a result, the information reading/writing device 112 provided inside each satellite 12 of the gaming machine 10 can read out the game initial data and game history data from the token with built-in IC chip 30 via the connectors 19a and, furthermore, it is also possible to write the game initial data and game history data onto the token with built-in IC chip 30.

FIG. 3A is a front view schematically showing the token with built-in IC chip that is configured integrally with an action figure and FIG. 3B is a perspective view showing the appearance of the token with built-in IC chip shown in FIG. 3A when it is installed on the support 20 shown in FIG. 3B for token with built-in IC chip installation provided in the gaming machine 10 according to this embodiment of this invention.

A portion including the to face of token with built-in IC chip 30 is fitted into and secured in a recess 32a made in the bottom face or the bottom half of the base portion 32 of a disk shape, as shown in FIG. 3A. In addition, an action FIG. 33 imitating a samurai commander of the Warring States Period is made of resin and is secured to the top face of the base portion 32. Thus, the token with built-in IC chip 30 is formed so as to be integrated with the action FIG. 33. Here, this action FIG. 33 is made to resemble the appearance of one of the characters (unit) in the strategic simulation game provided in the gaming machine 10.

In addition, as shown in FIG. 3B, five recesses 19 in approximately circular forms are provided in the support 20 for token with built-in IC chip installation provided in the gaming machine 10 and a connector 19a provided with eight terminals made of metal is provided at the bottom of each recess 19.

This connector 19a is connected to the information reading/writing device 112 provided inside the satellite 12, as described above.

In addition, a protrusion 19b for token positioning is provided at a portion of the peripheral rim of each recess 19. The token with built-in IC chip 30 is placed in the recess 19 so that this protrusion 19b is engaged with the notch 30a provided in the token with built-in IC chip 30. Therefore, eight terminals made of metal provided in connector 19a can be inserted into eight openings 30b provided at the bottom face of the token with built-in IC chip 30.

As a result, the pins 31a of the IC chip 31, which are exposed to the outside through the openings 30b, can make contact with the terminals made of metal provided in the connector 19a so that the information reading/writing device 112 provided inside the satellite 12 of the gaming machine 10 can read out the game initial data and game history data from the token with built-in IC chip via the connector 19a and, in addition, it is also possible to write the game initial data and game history data onto the token with built-in IC chip.

Next, the internal schematic structure of the gaming machine 10 according to this embodiment of this invention is described.

Figure 4:
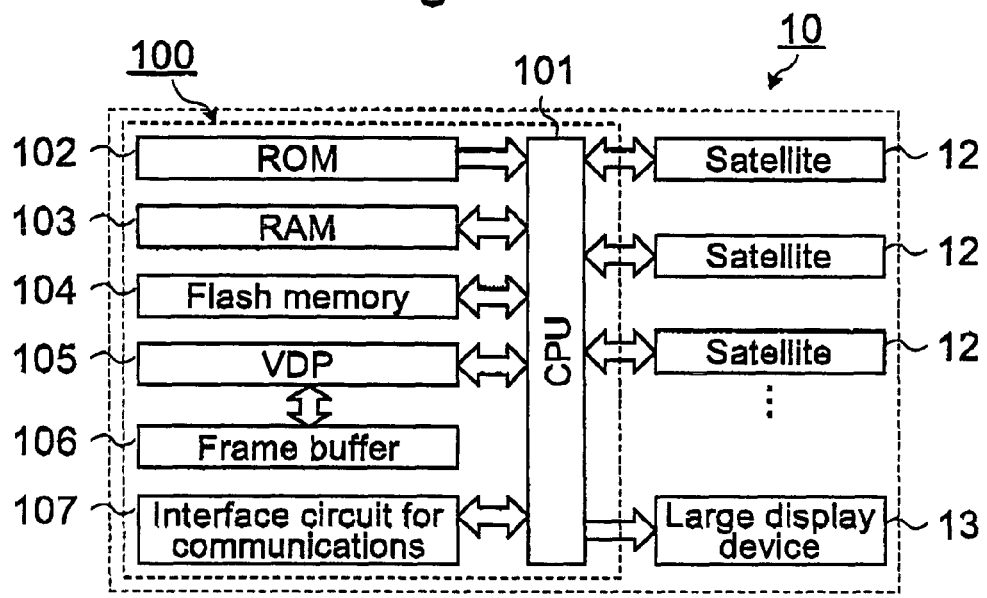
FIG. 4A is a block diagram of the gaming machine in FIG. 1.
FIG. 4B is a block diagram of one of the satellites constituting the gaming machine in FIG. 4A.
Figure 4:
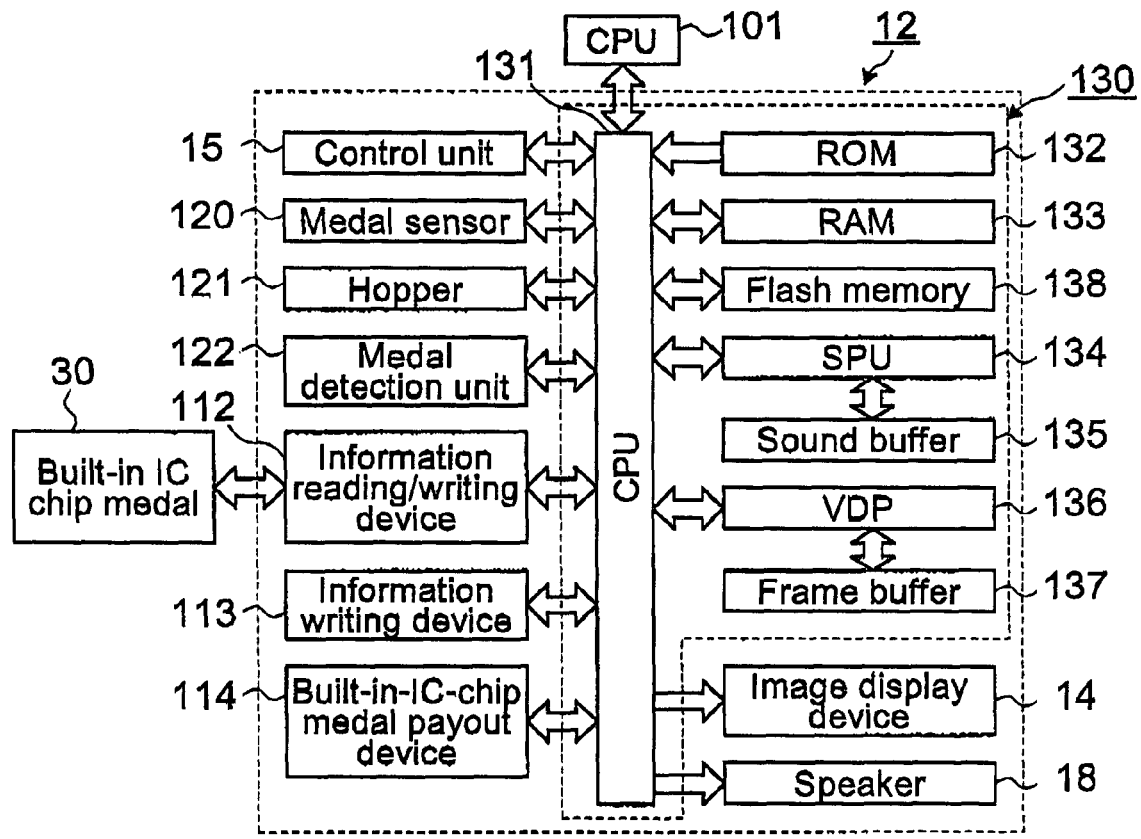

FIG. 4A is a block diagram showing the internal schematic structure of the gaming machine 10 shown in FIG. 1 and FIG. 4B is a block diagram showing the internal schematic structure of the satellite 12, which is one of the components of the gaming machine 10.

As shown in FIG. 4A, the gaming machine 10 is composed of a main control unit 100 that includes a CPU (central processing unit) 101, a ROM (read-only memory) 102, a RAM (random access memory) 103, and a flash memory

104, of eight satellites 12, and of a large display device 13. Here, some of the eight satellites are omitted in FIG. 4A.

The CPU 101 is configured so as to carry out a variety of processes based on input signals supplied by the respective satellites 12 as well as on data and programs stored in ROM 102, RAM 103, and flash memory 104. Then, the CPU 101 transmits a command signal to each satellite 12 based on the results of the above-described processes so as to primarily control each satellite 12 in order that the strategic simulation game proceeds.

In addition, the CPU 101 is internally provided with a DSP (digital signal processor) and is configured so that the processing can be carried out at a high speed based on the input signals received from the respective satellites 12 as well as on the data and programs stored in the ROM 102, the RAM 103, and the flash memory 104.

The ROM 102 is composed of a semiconductor memory, for example, and stores a program for implementing the basic functions of the gaming machine 10, a program for the progress of the strategic simulation game and a program for the main control of the respective satellites 12. The ROM 102, moreover, stores a variety of image data to be displayed on the screens 13a of the large display device 13, and data concerning or the capability values of the units constituting the group.

The RAM 103 temporarily stores the game initial data and game history data supplied by the respective satellites 12 as well as data concerning a result of the process carried out by the CPU 101. The above-described game initial data and game history data include data concerning the groups and data concerning the group leaders and the units constituting the groups. The flash memory 104 stores data concerning the players of the game at the respective satellites 12.

Here, the flash memory 104 may store the data instead of the RAM 103. The RAM 103 may store the data instead of the flash memory 104. However, the gaming machine 10 does not have to have the flash memory 104 installed.

In addition, a VDP (video digital processor) 105, a frame buffer 106 and an interface circuit 107 for communications are connected to the CPU 101 and, furthermore, the large display device 13 is connected to the main control unit 100 (CPU 101).

The VDP 105 reads out the necessary image data from the ROM 102 in accordance with the image formation order transmitted by the CPU 101 and composite image data is produced in the frame buffer 106 based on this image data. In addition, a 3D graphics accelerator may be mounted in the VDP 105. It may be possible to increase the processing speed to produce the composite image data by means of the 3D graphics accelerator.

The frame buffer 106 is a memory where the above-described composite image data is produced by the VDP 105 and the above-described composite image data is output to the large display device 13 by means of the VDP 105. The frame buffer 106 is usually composed of a dual port RAM that simultaneously allows input of the image data from the VDP 106 and output of the composite image data to the large display device 13.

An interface circuit 107 for communications is used for communications with the outside (a server for managing the game installed in the game arcade, for example) via communication lines, such as the internet and a local area network (LAN) and the CPU 101 transmits the game initial data and game history data to the outside via this interface circuit 107 for communications when it is detected and determined by the CPU 101 that the game initial data or the game history data has been newly stored in the RAM 103 or the flash memory 104.

At this time, the main control unit 100, including the CPU 101 and the interface circuit 107, functions as data transmission means for transmitting the game initial data and game history data having been read out by the information reading/writing device 112 to the outside.

In addition, the CPU 101 receives a stop signal for stopping the commencement or progress of the game according to a predetermined timing via the interface circuit 107 so that a process for stopping the commencement or progress of the game based on the predetermined game initial data or game history data is carried out according to this stop signal.

At this time, the main control, unit 100, including the CPU 101 and the interface circuit 107, functions as stop signal reception means for receiving the stop signal from the outside for stopping the commencement or progress of the game. In addition, the main control unit 100 and each satellite 12 function as game stop means for stopping the commencement or progress of the game based on the predetermined game initial data or game history data according to the stop signal.

The large display device 13 displays composite image data produced in the frame buffer 106 by the VDP 105 on the screens 13a.

This large display device 13 may display the same images as images displayed on the screen 14a of each satellite 12 in accordance with the status of the strategic simulation game in progress, and different images from the images displayed on any one of the screens 14a.

Next, the satellites 12 connected to the CPU 101 of the main control unit 100 are described below.

Each satellite 12 is composed of the control unit 130 and peripheral devices thereof, as shown in FIG. 4B.

The control unit 130 is composed of a CPU 131, a ROM 132, a RAM 133, and a flash memory 138. The control unit 130, furthermore, includes an SPU (sound processing unit) 134, a sound buffer 135, a VDP 136, and a frame buffer 137.

The CPU 131 carries out a variety of processes in response to the operation input by the player based on an input signal supplied from a control unit 15, and data and programs stored in the ROM 132, the RAM 133, and the flash memory 138. The CPU transmits the results of the processes to the CPU 101 of the above-described main control unit 100. In the meantime, the CPU 131 receives a command signal from the CPU 101, controls the peripheral devices, which are components of the satellite 12, and keeps the strategic simulation game proceeding at the satellite 12.

In addition, depending on process contents, the CPU 131 carries out a variety of processes in response to the operation input by the player based on the input signal supplied from the control unit 15 and the data and programs stored in the ROM 132 and the RAM 133, controls the peripheral devices, which are components of the satellite 12, and keeps the strategic simulation game proceeding at the satellite 12 based on the results of the above described processes. Here, it is determined at a case-by-case basis which way to be used for each of the processes in accordance with the process contents.

Furthermore, the CPU 131 is provided, as a co-processor, with a processor for mathematic operation of a matrix, a vector, and the like concerning the generation of the image data. Thus, the results of the mathematic operation are transmitted to the VDP 136 described below as an image formation instruction.

The ROM 132 stores a program for implementing the basic functions of the satellites 12, a program necessary for carrying out the strategic simulation game, image data and sound data, data for BGM such as PCM (pulse code modulation), speech sound, sound effects, and the like.

The RAM 133 stores the game initial data and game history data, for example, to be read out from the token with built-in IC chip 30, and furthermore stores temporarily data supplied from the CPU 101, data concerning the process that has been carried out by the CPU 131, and the like. The flash memory 138 stores data (e.g., game history data) concerning the players of the game at the satellites 12.

The SPU 134 is a sub-processor that incorporates, for example, a PCM sound source unit and is controlled by the CPU 131. The CPU 131 selects and reads out the necessary sound data among the sound data stored in the ROM 132 and transfers the data that has been read out to the sound buffer 135. The SPU 134 produces a sound signal for generating EGM, speech sound, sound effects, and the like based on the above described sound data stored in the sound buffer 135 and transmits this sound signal to the speaker 18. As a result, the sound according to the above described sound data is output from the speaker 18.

The VDP 136 reads out the necessary image data from the ROM 132 in accordance with the image formation instruction from the CPU 131 and generates the composite image data in the frame buffer 137 according to this image data. In addition, a 3D graphics accelerator may be mounted in the VDP 136. It becomes possible to increase the processing speed for generating the composite image data by means of the 3D graphics accelerator.

The frame buffer 137 is a memory for generating the composite image data by means of the VDP 136 and the above described composite image data is output to the image display device 14 by means of the VDP 136. The frame buffer 137 is usually composed of a dual port RAM that allows the simultaneous input of the image data from the VDP 136 and the simultaneous output of the composite image data to the image display device 14.

The control unit 15, into which the player's controls are input, the token sensor for detecting the token being inserted into the token insertion slot 16, the hopper 121 for paying out the tokens, and the token detection unit 122 for detecting the tokens paid out by the hopper are connected to the above described control unit 130 (CPU 131).

The control unit 15 is provided with a plurality of control buttons and when a predetermined instruction is input by the player through the control of one of the control buttons, an instruction signal according to this instruction is supplied to the CPU 131. The CPU 131 carries out a variety of processes based on this instruction signal as well as the data and programs stored in the ROM 132, the RAM 133, and the flash memory 138.

The token sensor 120 transmits a detection signal to the CPU 131 after detecting the token that has been inserted in the token insertion slot 16. The CPU 131, which has received the above described detection signal, updates (increases) the number of points that have been stored in the RAM 133 and stores the updated number of the points.

In the case where three tokens are inserted into the token insertion slot 16 when 10 points are stored, for example, in the RAM 133, the token sensor 120 carries out token detection three times and transmits a detection signal to CPU 131 three times. The CPU 131 adds one point to the number of points that are stored in the RAM 133 at every time when a detection signal is received and stores the accumulated points. As a result, the RAM 133 stores 13 points.

The hopper 121 is driven by the instruction signal from the CPU 131, which is issued after the reception of an input of the control for paying out points as tokens from the control unit 15, and carries out a process for paying out the tokens.

The token detection unit 122 transmits a detection signal to the CPU 131 after detecting a token paid out from the hopper 121. The CPU 131 stores the indication of reception of a detection signal in the RAM 133 at every time when a detection signal is received, and transmits an instruction signal to the hopper 121 for stopping payout of the tokens when it is determined that the number of times that a detection signal has been received reaches a predetermined number. As a result, the payout of the tokens by means of the hopper 121 is completed.

In addition, the information reading/writing device 112 is connected to the above described control unit 130 (CPU 131). This information reading/writing device 112 writes at least one of the game initial data and game history data onto the token with built-in IC chip 30 from another token with built-in IC chip 30 installed in one of the recesses 19 of the support 20 for tokens with built-in IC chip installation via the connector 19a. This information reading/writing device 112 reads at least one of the game initial data and game history data from the another token with built-in IC chip 30.

That is to say, the information reading/writing device 112 carries out a recognition process of the token with built-in IC chip 30 installed in the recess 19 upon receipt of the instruction signal from the CPU 131 and writes at least one of the game initial data and game history data onto the token with built-in IC chip 30 inside the satellite 12 in the case where the installation of the token with built-in IC chip 30 has been recognized. Here, the data written onto the token with built-in IC chip 30 is identical to the data stored in the ROM 132, the RAM 133 or the flash memory 138.

In addition, the information reading/writing device 112 carries out a recognition process of the token with built-in IC chip 30 installed in one of the recesses 19 upon receipt of an instruction signal from the CPU 131 and writes at least one of the game initial data and game history data onto another token with built-in IC chip 30 inside the satellite 12 in the case where the installation of the token with built-in IC chip 30 has been recognized. Here, the data the written onto the token with built-in IC chip 30 is identical to the data stored in the ROM 132, the RAM 133, or the flash memory 138. The data that has been read out is stored in the RAM 133 or the flash memory 138 by means of the CPU 131.

In addition, the information writing device 113 and a built-in-IC-chip-token-payout device 114 for paying out tokens with built-in IC chip are connected to the control unit 130 (CPU 131).

This information writing device 113 carries out processes of writing data concerning the units to a token with built-in IC chip 30 that has been stored in a predetermined place within the satellite 12 after an instruction signal issued from the CPU 131 is received in response to the satisfaction of the predetermined conditions during the strategic simulation game in progress.

In addition, the built-in-IC-chip-token-payout device 114 for paying out tokens with built-in IC chip carries out a paying out processing of tokens with built-in IC chip 30 from the outlet 22 for paying out tokens with built-in IC chip upon receipt of an instruction signal from the CPU 131. The data concerning the units has been written onto the tokens with built-in IC chip.

Furthermore, the image display device 14 and the speaker 18 are connected to the control unit 130 (CPU 131). The image display device 14 displays composite image data produced in the frame buffer 137 by the VDP 136 on the screens 14a while the speaker 18 receives a sound signal generated by the SPU 134 so as to output the sound based on this sound signal. The images being displayed on these screens 14a and the sound emitted from the speaker 18 are produced in the strategic simulation game in progress.

The player controls the control unit 15 while recognizing the images displayed on these screens 14a and the emitted sound from the speaker 18 and, thereby, continues the strategic simulation game.

Next, the server for managing the game according to the embodiment of this invention is described in reference to the drawings.

Figure 5:
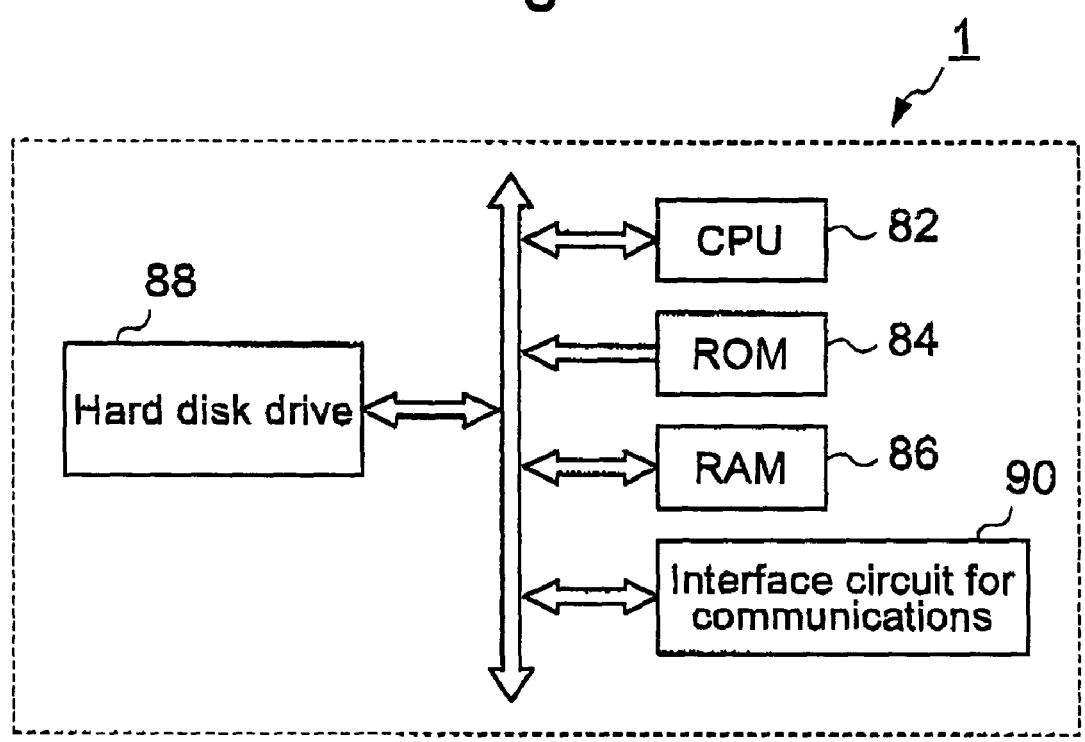
FIG. 5 is a block diagram of a server for managing a game.

FIG. 5 is a block diagram schematically showing the configuration of the server for managing the game of this invention. A server 1 for managing the game is composed of a hard disk drive 88, a CPU 82, a ROM 84, a RAM 86, and an interface circuit 90 for communications. The hard disk drive 88 stores a program for communications with one or more gaming machines 10, a program for acquiring the game initial data and game history data supplied from each gaming machine 10 and a program for storing the acquired game initial data and game history data in the hard disk drive 88, for example.

The interface circuit 90 for communications is used for communications with one or more gaming machines 10 by means of wireless or wire communications via the internet or a LAN. The CPU 82 carries out the above described programs so as to acquire the game initial data or the game history data supplied from the gaming machine 10 and stores the acquired the game initial data or the game history data in hard disk drive 88. The ROM 84 stores programs and data required for the operation of server 1 for managing the game.

The RAM 86 stores the data acquired from the gaming machines 10, that is to say, the game initial data and game history data. Here, these pieces of data may be stored in the hard disk drive 88.

Here, as described above, a plurality of gaming machines and a server 1 for managing the game connected to the plurality of gaming machines 10 via lines form the server system for managing the game that can manage and monitor the game in the gaming machine 10 as well as the data used for the game.

In the following, it is assumed that the gaming machine 10 and the server 1 for managing the game have been started up and variables used for the above described CPU 101, the CPU 131 and the CPU 82 are initialized to the predetermined values so as to operate in a steady manner and the gaming machine 10 and the server 1 for managing the game are in a condition where communications between them is possible.

In addition, although descriptions are omitted unless otherwise stated, images are displayed in accordance with the status of the strategic simulation game in progress on the screens 13a of the large display device 13 and on the screens 14a of the image display devices 14 provided in the respective satellites 12, and BGM, speech sound, sound effects, and the like, are emitted from the speakers 18 provided in the respective satellites 12 at the time when a sub-routine, shown in each flowchart, is carried out in the gaming machine 10.

Figure 6:
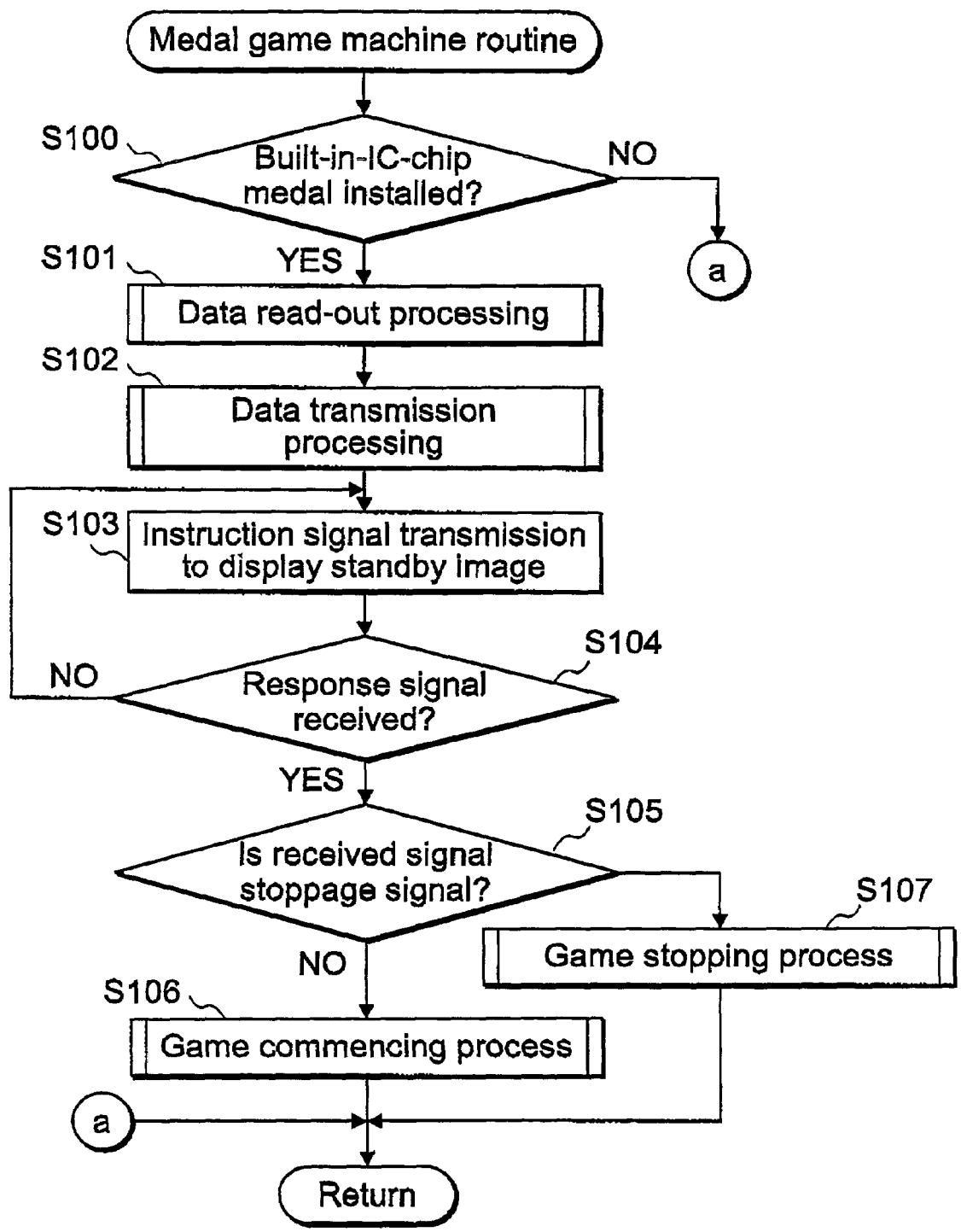
FIG. 6 shows a flowchart of a sub-routine that is carried out in a gaming machine.

FIG. 6 is a flowchart showing a sub-routine that is carried out in the main control unit 100 provided in the gaming machine 10. This sub-routine is for carrying out a process in order to determine the appropriateness of the token with built-in IC chip 30 to be used in the gaming machine 10 and is carried out after being called from a control program for controlling the game with the gaming machine 10 that has been carried out in advance according to a predetermined timing.

First, the CPU 101 determines whether or not the token with built-in IC chip 30 has been installed (Step S100). That is to say, the CPU 101 determines whether or not a recognition signal has been received, which indicates the installation of the token with built-in IC chip 30 from the CPU 131 of the control unit 130 provided in one of the satellites 12 (hereinafter referred to "satellite S").

This recognition signal is a signal emitted from the information reading/writing device 112 in response to the installation of the token with built-in IC chip 30 in one of the recesses 19 of the support 20 for installation of token with built-in IC chip in satellite S.

This sub-routine is completed in the case where it is determined that no tokens with built-in IC chip 30 have been installed in any of the recesses 19 of the support 20 for installation of token with built-in IC chip provided in the respective satellites 12.

On the other hand, the CPU 101 carries out a data reading process for reading the data stored in the token with built-in IC chip 30 in the case where it is determined that the token with built-in IC chip 30 has been installed in one of the recesses 19 of the support 20 for installation of token with built-in IC chip provided in the satellite S (Step S101).

The CPU 101 transmits an instruction signal to the CPU 131 of the control unit 130 provided in the satellite S to instruct that the data having been stored in the token with built-in IC chip 30 be read out according to the above described data reading process. On the other hand, the CPU 131 of the control unit 130 provided in the satellite S carries out a reading process of the data having been stored in the token with built-in IC chip 30 by means of the information reading/writing device 112 upon receipt of the above-described instruction signal, and stores the read-out data in the RAM 133 or in the flash memory 138.

Furthermore, the CPU 101 acquires data stored in the RAM 133 or in the flash memory 138 of the control unit 130 provided in the satellite S and carries out a process of storing the acquired data in the RAM 103 or in the flash memory 104.

At this time, the main control unit 100, the control unit 130 provided in the satellite S, and the information reading/writing device 112 render a function as data reading means for reading the game initial data and game history data from the token with built-in IC chip 30. Here, the control unit 130 and the information reading/writing device 112 or the information writing device 113 can render a function as data writing means for writing the game history data to the token with built-in IC chip 30.

Next, the CPU 101 carries out a data transmission process for transmitting the game initial data or the game history data that has been stored in the RAM 103 or in the flash memory 104 in Step S101 to the outside (the server 1 for managing the game) via the interface circuit 107 for communications (Step S102).

At this time, main control unit 100 functions as data transmission means for transmitting the game initial data and game history data that has been read out by the data reading means to the outside (server 1 for managing a game).

Next, the CPU 101 transmits an instruction signal to the CPU 131 of the control unit 130 provided in the satellite S to instruct that an image asking the player to wait or be standby (hereinafter referred to "standby image") until completion of the predetermined process be displayed (Step S103).

On the other hand, the CPU 131 carries out a process of displaying the standby image on the screen 14a of the image display device 14 upon receipt of the above-described instruction signal. That is to say, the VDP 136 reads out necessary image data from among the image data stored in the ROM 132 according to an image formation instruction from the CPU 131 so as to generate composite image data, which is written onto the frame buffer 137. After that, the composite image data having been written onto the frame buffer 137 is transmitted to the image display device 14 and, thereby, the standby image is displayed on the screen 14a.

Next, the CPU 101 determines whether or not a response signal is received from the server 1 for managing the game via the interface circuit 107 for communications (Step S104). This response signal is a signal emitted from the server 1 for managing the game in Step S204 or S206 in the subroutine described below shown in FIG. 7.

That is to say, when the game initial data or the game history data is supplied to the server 1 for managing the game in the above-described Step S102, the data that has been stored beforehand and the acquired game initial data or game history data are compared with the server 1 for managing the game. As a result, a response signal is transmitted in Step S204 in the case where the identification data included in the acquired game initial data or game history data exists in the data that has been stored beforehand. On the other hand, a stop signal is transmitted as a response signal in Step S206 in the case wherein identification data included in the acquired game initial data or game history data does not exist in the data that has been stored beforehand. It is determined in Step S104 whether or not the response signal or stop signal (as a response signal) transmitted has been received.

The main control unit 100 functions as stop signal reception means for receiving a stop signal in order to stop the commencement or progress of the game in the case where the stop signal that has been transmitted as a response signal is received from the server 1 for managing the game in the above-described Step S102.

The program returns to Step S103 in the case where it is determined that no response signal has been received and the process in Step S103 is repeatedly carried out until a response signal is received.

Here, the process may proceed assuming that a response signal has been received so that the process of the commencement of the game may be carried out in Step S106, or that the process in Step S107 may be carried out assuming that an error has occurred so that the game is stopped in the case where no responses have been received from the server 1 for managing the game after a predetermined period of time has elapsed subsequent to the start of the process in Step S103.

On the other hand, the CPU 101 determines whether or not the received response signal is a stop signal in the case where it is determined that a response signal has been received (Step S105).

The identification data included in the game initial data or the game history data that has been read out in Step S101 existing from among the data that has been stored beforehand in the server 1 for managing the game in the case where the received response signal is not a stop signal. That is to say, the token with built-in IC chip 30 that has been installed in one of the recesses 19 of the support 20 of the satellite S for installation of the token with built-in IC chip is not a token with built-in IC chip that was used in another game arcade nor is a token with built-in IC chip that has data having been fraudulently modified and stored.

Accordingly, the CPU 101 carries out a process of the commencement of the game (Step S106) and carries out the commencement or progress of the game based on the game initial data or the game history data that has been read out in Step S101 in the case where it is determined in Step S105 that the received response signal is not a stop signal.

On the other hand, the identification data included in the game initial data or the game history data that has been read out in Step S101 does not exist in the data that has been stored beforehand in the server 1 for managing the game in the case where the received response signal is a stop signal. That is to say, the token with built-in IC chip 30 that has been installed in one of the recesses 19 of the support 20 of the satellite S for installation of token with built-in IC chip is a token with built-in IC chip that was used in another game arcade or is a token with built-in IC chip that has data fraudulently having been modified and stored. Accordingly, the CPU 101 carries out a process for stopping the game (Step S107) so that the commencement or progress of the game based on the game initial data or the game history data that has been readout in Step S101 is stopped in the case where it is determined in Step S105 that the received response signal is a stop signal.

At this time, the main control unit 100 and the satellite S function as game stop means for stopping the commencement or progress of the game based on the predetermined game initial data or game history data according to the stop signal.

Here, an image indicating the occurrence of an error may be displayed, or an image indicating the installation of another token with built-in IC chip may be displayed, on the screen 14a of the image display device 14 provided in the satellite S at the time when the game is stopped in Step S107.

This subroutine is completed in the case where the process of Step S106 or S107 is completed.

Figure 7:
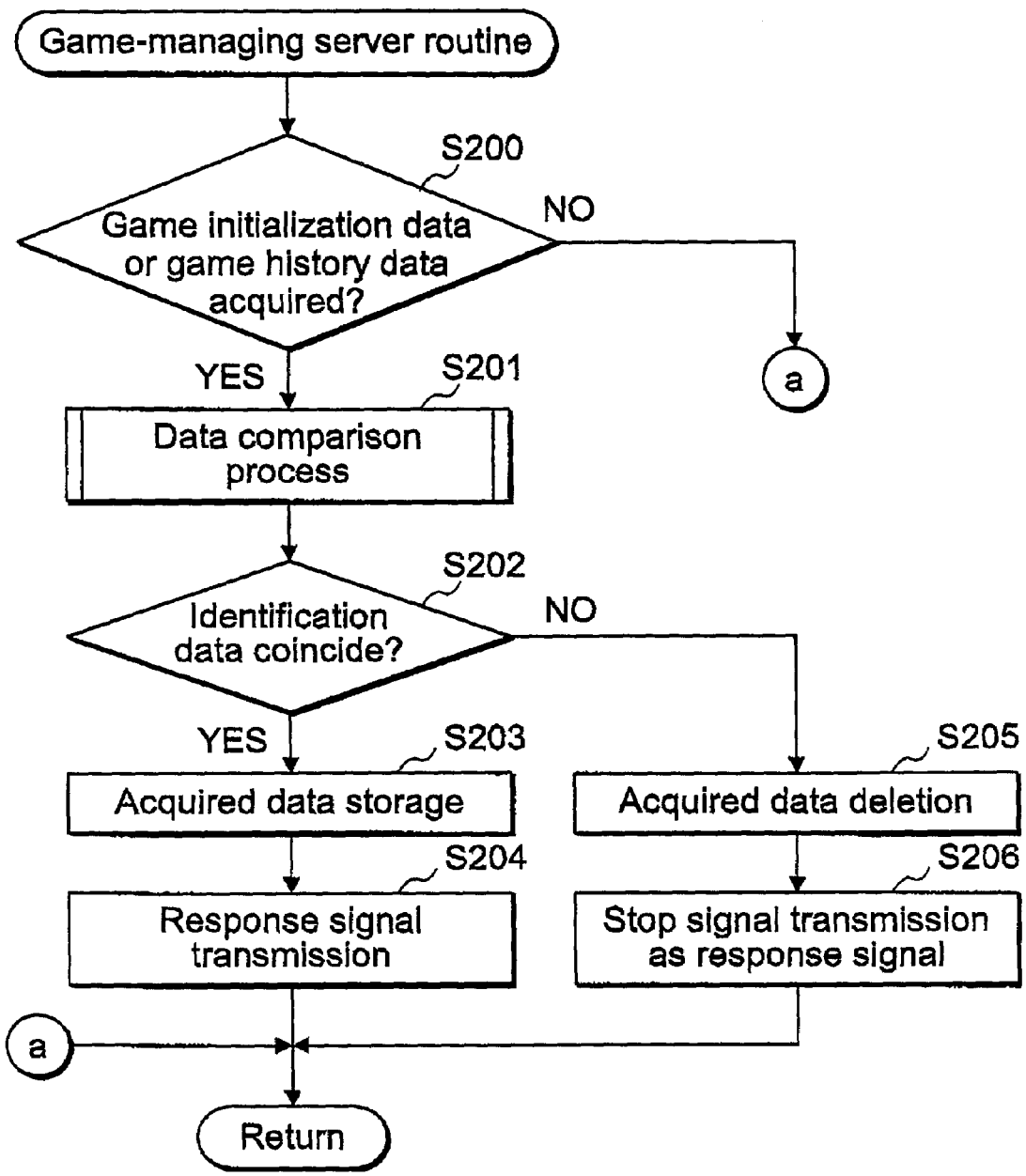
FIG. 7 is a flowchart of a sub-routine that is carried out in a server for managing a game.

FIG. 7 is a flowchart showing a subroutine carried out in the server 1 for managing the game in response to the subroutine shown in FIG. 6. This subroutine renders processes for the determination of appropriateness of a token with built-in IC chip that is used in the gaming machine 10 and is called from a control program that controls the operation of the server 1 for managing the game. The control program has already been carried out.

First, the CPU 82 determines whether or not the game initial data or the game history data has been acquired from the gaming machine 10 via the interface circuit 90 for communications (Step S200). This process corresponds to the above-described Step S102.

At this time, the server 1 for managing the game functions as data acquisition means for acquiring the game initial data and game history data that has been read out by the data reading means of the gaming machine 10.

This subroutine is completed in the case where the game initial data or the game history data has not been acquired.

On the other hand, the CPU 82 carries out a data comparison process so as to compare the acquired game initial data or game history data with the data that has been stored in the hard disk drive 88 previously when it has been determined that game initial data or game history has been acquired (Step S201).

This data comparison process is a process for determining whether or not the identification data included in the acquired game initial data or game history data coincides with the data that has been stored in the hard disk drive 88 previously.

Here, the identification data indicates data assigned to each individual player, to the token with built-in IC chip, and to the game arcade as described above, and the type of identification data, which is the subject of comparison, is not particularly limited.

The identification data assigned to the individual player may be compared, the identification data assigned to the individual token with built-in IC chip may be compared or the identification data assigned to the individual game arcade, for example, may be compared. Furthermore, all of these pieces of the identification data may be compared.

In addition, data that has been stored in the hard disk drive 88 previously includes data stored in the Step S203 described below and, furthermore, the identification data assigned to the token with built-in IC chip that has been stored previously and the identification data assigned to the individual game arcade is also included.

The server 1 for managing the game functions as data comparison means for comparing the game initial data or the game history data that has been acquired by the data acquisition means with the data that has been stored previously by the data storage means when the above described process is carried out in Step S201.

Next, as a result of the above described Step S201, the CPU 101 determines whether or not the identification data included in the acquired game initial data or game history data coincides with the data that has been stored in the hard disk drive 88 previously, that is to say, whether or not the identification data included in the acquired game initial data or game history data coincides with identification data that exists in the data that has been stored in hard disk drive 88 previously (Step S202).

When it is determined that the identification data included in the acquired game initial data or game history data and the identification data that exists in the data that has been stored in the hard disk drive 88 previously coincide with each other, the token with built-in IC chip 30 that has been installed in one of the recesses 19 of the support 20 of the satellite S for installation of token with built-in IC chip is not identical to a token with built-in IC chip that has been used in another game arcade, or the stored data has not been fraudulently modified.

Accordingly, when it is determined that the identification data included in the acquired game initial data or game history data and the identification data that exists in the data that has been stored in the hard disk drive 88 previously coincide with each other in Step S202, the CPU 82 carries out a process to store the acquired game initial data or game history data in the hard disk drive 88 (Step S203).

At this time, the server 1 for managing the game functions as data memory means that stores, at least, the game initial data or the game history data acquired by the data acquisition means. After that, the CPU 82 transmits a response signal via the interface circuit 90 indicating that the token with built-in IC chip 30 installed in one of the recesses 19 of the support 20 of the satellite S for installation of token with built-in IC chip is not a token with built-in IC chip that has been used in another game arcade and that the stored data has not been fraudulently modified (Step S204). Such process is equivalent to a process corresponding to the above described Step S104.

On the other hand, the CPU 82 carries out a process to eliminate the acquired game initial data or game history data when it is determined in Step S202 that the identification data included in the acquired game initial data or game history data and the identification data existing in the data that has been stored in the hard disk drive 88 previously do not coincide with each other (Step S205).

At this time it is also possible to store the data that did not coincide with the identification data existing in the data that has been stored in the hard disk drive 88 previously such that the acquired data is stored as data stored in a token with built-in IC chip that has been used in another game arcade, or as fraudulently modified data, without being deleted.

Next, the CPU 82 transmits a stop signal to the gaming machine 10 as a response signal via the interface circuit 90 (Step S206). This process is equivalent to a process corresponding to above described Step S104.

At this time, the server 1 for managing the game functions as game stop signal transmission means for transmitting a stop signal to the gaming machine 10 in order to stop the commencement or progress of the game based on the game initial data or the game history data that has been acquired by the above described data acquisition means where the identification data included in the game initial data or the game history data having been acquired by the above-described data acquisition means does not exist in the data that has been stored in the above-described data storage means previously as a result of the comparison carried out by the above-described data comparison means.

Subsequently, this sub-routine is completed when the process has been carried out in Step S204 or Step S206.

Figure 8:
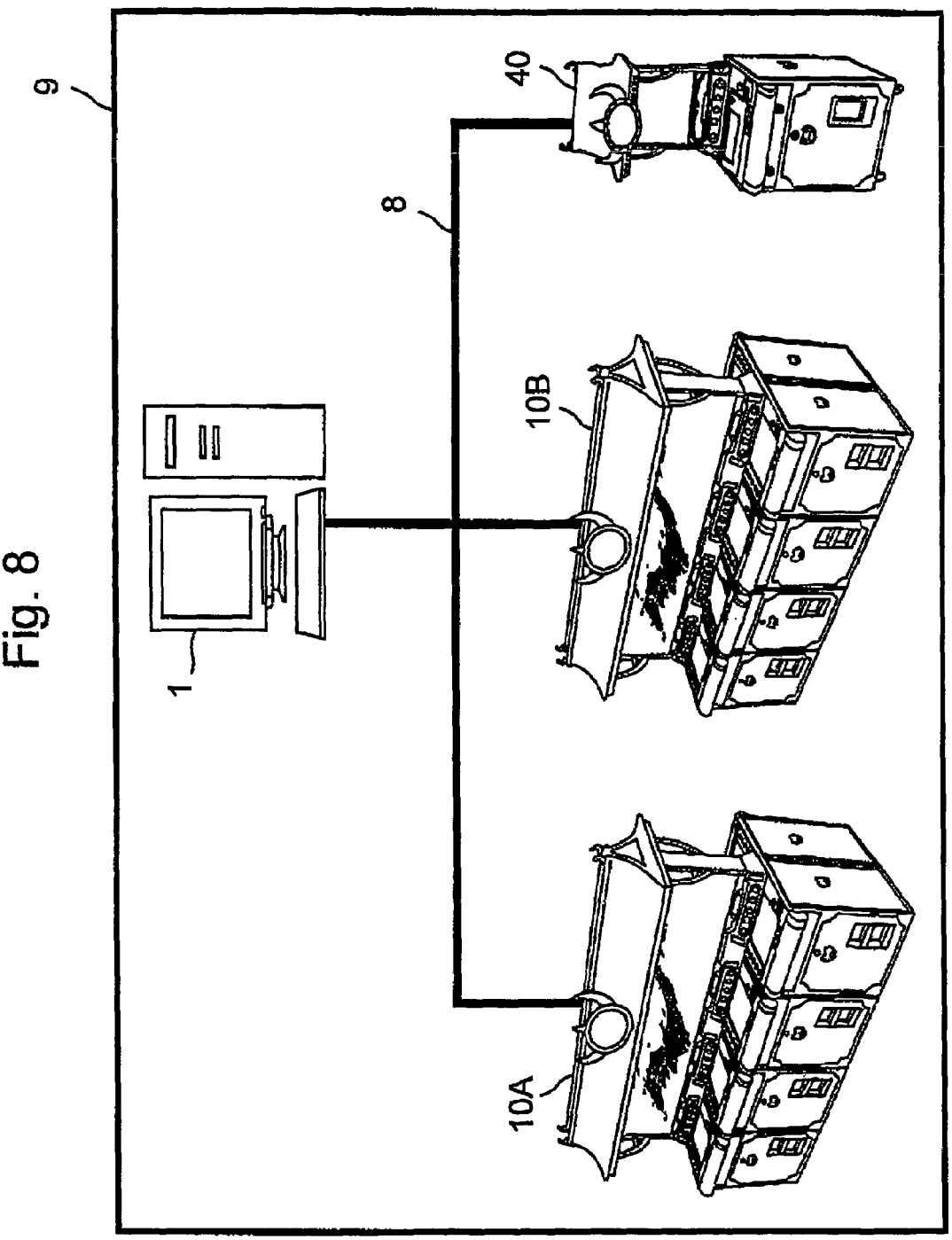
FIG. 8 shows schematically a computer network where a gaming machine and a server for managing a game are employed.

FIG. 8 is a schematic diagram showing an example of a computer network where gaming machines 10A, 10B of this invention and a server 1 for managing the game are used according to an embodiment of this invention.

The server 1 for managing the game and the gaming machines 10A and 10B that utilize tokens are connected via a network (or a wiring network) 8 in a game arcade 9, and transmission and reception of data and programs between the server and the gaming machines via the wiring network 8 are possible. This network 8, may be wired or wireless, or may be a combination thereof.

In addition, a machine 40 for dispensing tokens with built-in IC chip is also connected to the server 1 for managing the game and is connected to the gaming machines 10A and 10B that utilize the tokens via the network 8 and, at the same time, is in the condition where transmission and reception of data and programs among the server 1, the gaming machines 10A, 100 and the dispensing machine 40 are possible via the network 8.

This machine 40 for dispensing the tokens with built-in IC chip carries out a process for writing the game initial data onto the token with built-in IC chip 30 and a process for paying out the tokens with built-in IC chip 30 storing the game initial data having been written.

In the following, the manner that the player who has visited the game arcade 9 plays the game at the gaming machine 10A is sequentially described.

(A) Upon arrival at the game arcade 9, the player X first receives tokens with built-in IC chip 30 dispensed by the machine 40 for dispensing tokens with built-in IC chip. At this time, data concerning the characters (units) controlled by the player X in the game, and data concerning the points are stored in the tokens with built-in IC chip 30 as the game initial data. Furthermore, an ID code assigned to the player X and an ID code assigned to the game arcade are also stored. Here, an ID code assigned to each token with built-in IC chip may be written by the machine 40 for dispensing tokens with built-in IC chip or may be stored at the manufacturing stage of the tokens with built-in IC chip 30.

The game initial data written onto token with built-in IC chip 30 is transmitted to the server 1 for managing the game via the network 8 when the token with built-in IC chip 30 is paid out by the machine 40 for dispensing tokens with built-in IC chip. The server 1 for managing the game stores the acquired game initial data in the hard disk drive 88.

(B) The player X, who has received the dispensed tokens with built-in IC chip 30, starts the game with the gaming machine 10A that utilizes tokens. At this time the gaming machine 10A that utilizes tokens reads out the game initial data stored in the token with built-in IC chip 30 and, then, the read out game initial data is transmitted to the server 1 for managing the game via the network 8.

The server 1 for managing the game carries out a process to compare the identification data included in the game initial data acquired from the gaming machine 10A that utilizes tokens with the data that has been stored in the hard disk drive 88 previously. The identification data included in the game initial data acquired from the gaming machine 10A that utilizes tokens and the identification data included in the game initial data that has been stored in the hard disk drive 88 in the above described (A) coincide, of course, with each other.

Accordingly, the server 1 for managing the game stores the game initial data acquired from the gaming machine 10A that utilizes tokens in the hard disk drive 88 and, furthermore, a response signal is transmitted to the gaming machine 10. Upon receipt of the response signal, the game proceeds based on the game initial data read out from the tokens with built-in IC chip 30 in the gaming machine 10A that utilizes tokens.

(C) When the player X resumes the game by using the same tokens with built-in IC chip 30 that was used for the game previously in the gaming machine 10B that utilizes tokens after the player X stopped the game in the middle of it with the gaming machine, the gaming machine 10B that utilizes tokens reads out the game history data stored in the token with built-in IC chip 30 and, then, transmits the game history data that has been read out to the server 1 for managing the game via the network 8.

The server 1 for managing the game carries out a process to compare the identification data included in the game history data acquired from the gaming machine 10B that utilizes tokens with the identification data included in the data that has been stored in the hard disk drive 88 previously. The identification data included in the game history data acquired from the gaming machine 10B that utilizes tokens and the identification data included in the game history data that has been stored in the hard disk drive 88 in the above described (B) coincide, of course, with each other.

Accordingly, the server 1 stores the game history data acquired from the gaming machine 10B that utilizes tokens in the hard disk drive 88 and, furthermore, transmits a response signal to the gaming machine. The game proceeds based on the game history data that has been read out from the tokens with built-in IC chip 30 upon receipt of the response signal in the gaming machine 10B that utilizes tokens.

(D) In the case wherein a player Y visits game arcade 9 with a token with built-in IC chip 30 that has been utilized in another game arcade and starts the game at the gaming machine 10A that utilizes tokens, the gaming machine 10A that utilizes tokens reads out the game history data stored in the token with built-in IC chip 30 and transmits the read out game history data to the server 1 for managing the game via the network 8.

The server 1 for managing the game carries out a process to compare the identification data included in the game initial or history data that has been acquired from the gaming machine 10A that utilizes tokens with the data that has been stored in the hard disk drive 88 previously. The identification data included in the game history data acquired from the gaming machine 10A that utilizes tokens does not, of course, coincide with the identification data included in the data that has been stored in the hard disk drive 88 previously. Accordingly, the server 1 for managing the game deletes the game history data acquired from the gaming machine 10A that utilizes tokens and furthermore, transmits a stop signal to the gaming machine 10A that utilizes tokens as a response signal. The progress of the game based on the game history data read out from the token with built-in IC chip 30 is stopped when the stop signal is received by the gaming machine 10A that utilizes tokens.

Here, although the network 8 as a computer network formed so as to include a plurality of gaming machines and a server for managing a game installed in one game arcade are described in the above example, this invention may be applied to a computer network being composed of one or more gaming machines installed in each of a plurality of game arcades, and one or more servers for managing the game.

Thus, the game initial data and game history data read out from the token with built-in IC chip is transmitted to the outside (a server for managing a game installed in a game arcade, for example) according to the gaming machine according to the embodiment of this invention and, therefore, it is possible for the manager of the game arcade to recognize at an early stage whether or not the token with built-in IC chip that is being used in the game has been used in another game arcade as well as whether or not the data stored in this token with built-in IC chip has been fraudulently modified. Accordingly, it may be possible for the manager of the game arcade to quickly respond to a game being played by using such token with built-in IC chip and, thereby, the utilization of the token with built-in IC chip that has been used in another game arcade as well as the utilization of the token with built-in IC chip in which modified data has been stored can be prevented.

As a result, it may be possible for the game arcade to attract new players and a profit can be made through the introduction of such gaming machine and, furthermore, the players can concentrate on and enjoy the game without feeling that they have been treated unfairly and without feeling displeasure.

In addition, the game initial data and game history data that have been stored in a token with built-in IC chip can be acquired via the gaming machine and can be stored according to the server for managing the game according to the embodiment of this invention and, therefore, it may be possible for the manager of the game arcade to recognize at an early stage whether or not the token with built-in IC chip that is being used in the game has been used in another game arcade as well as whether or not the data stored in this token with built-in IC chip has been fraudulently modified based on the data. Accordingly, it may be possible for the manager of the game arcade to quickly respond to a game being played using such token with built-in IC chip and, thereby, the utilization of the token with built-in IC chip that has been used in another game arcade as well as the utilization of the token with built-in IC chip in which modified data has been stored can be prevented.

As a result, it may be possible for the game arcade to attract new players and a profit can be made through the introduction of gaming machine and, furthermore, the players can concentrate on and enjoy the game without feeling that they have been treated unfairly and without feeling displeasure.

What is claimed is:

1. A gaming machine comprising:
   data reading means for reading game data from a token with built-in IC chip; and
   data transmission means for transmitting the game data being read out by the data reading means,
   wherein the data reading means comprises an upward-facing recess such that the token with built-in IC chip is fitted into the recess;
   wherein the upward-facing recess is provided on a support disposed next to a display device which shows progress of a game; and
   wherein an action figure is attached to the token with built-in IC chip in a detachable manner.

2. The gaming machine according to claim 1, further comprising:
   stop signal reception means for receiving a stop signal so as to stop commencement or the progress of the game; and
   game stop means for stopping the commencement or the progress of the game based on the game data.

3. The gaming machine according to claim 2, wherein the stop signal is transmitted depending on a degree of difference between pre-recorded data and the game data transmitted by the data transmission means, the pre-recorded data and the game data being compared with each other.

4. A system for managing a game being used for a computer network comprising:
   at least one gaming machine comprising data reading means for reading game data from a token with built-in IC chip; and
   a server comprising:
      data acquisition means for acquiring the game data being read out by the data reading means of the gaming machine; and
      data storage means for storing at least the game data being acquired by the data acquisition means,
   wherein the data reading means comprises an upward-facing recess such that the token with built-in IC chip is fitted into the recess;
   wherein the upward-facing recess is provided on a support disposed next to a display device which shows progress of the game; and
   wherein an action figure is attached to the token with built-in IC chip in a detachable manner.

5. The system for managing the game according to claim 4, further comprising:
   data comparison means for comparing the game data being acquired by the data acquisition means with pre-recorded data stored by the data storage means; and
   game stop signal transmission means for transmitting a stop signal to the gaming machine in order to stop commencement or the progress of the game in a case where identification data included in the game data acquired by the data acquisition means is not found in the pre-recorded data stored in the data storage means in the comparison of the game data with the pre-recorded data.

6. The gaming machine according to claim 1, wherein the data reading means further comprises another upward-facing recess such that another token with built-in IC chip is fitted into the other recess, thereby allowing two tokens with built-in IC chip to be simultaneously used.

7. The gaming machine according to claim 1, wherein the upward-facing recess is provided with a protrusion from a peripheral rim of the recess such that a notch provided in the token with built-in IC chip engages with the protrusion.

8. The system for managing the game according to claim 4, wherein the upward-facing recess is provided with a protrusion from a peripheral rim of the recess such that a notch provided in the token with built-in IC chip engages with the protrusion.

9. A gaming machine utilizing a token with built-in IC chip, comprising:
   an information reader, which reads game data from the token with built-in IC chip; and
   a data transmitter comprising an interface circuit, which transmits the game data read by the information reading device;
   wherein the information reader comprises an upward-facing recess such that the token with built-in IC chip is fitted into the recess;
   wherein the upward-facing recess is provided on a support disposed next to a display device which shows progress of a game; and
   wherein an action figure is attached to the token with built-in IC chip in a detachable manner.

10. The gaming machine according to claim 9, wherein the information reader further comprises another upward-facing recess configured such that another token with build-in IC chip is fitted into the other recess, thereby allowing two tokens with built-in IC chip to be simultaneously used.

11. The gaming machine according to claim 9, further comprising:
    a CPU;
    wherein responsive to a stop signal received via the interface circuit a process for stopping the commencement or the progress of the game is carried out by the CPU.

12. The gaming machine according to claim 9, wherein the stop signal represents a degree of difference between pre-recorded data and the game data transmitted by the data transmitter.

13. The gaming machine according to claim 12, wherein the stop signal represents the degree of difference between identification data included in the transmitted game data and the pre-recorded data.

14. The gaming machine according to claim 9, wherein the upward-facing recess is provided with a protrusion from a peripheral rim of the recess such that a notch provided in the token with built-in IC chip engages with the protrusion.

15. The gaming machine according to claim 9,
    wherein the gaming machine utilizes an ordinary token without a built-in IC chips; and
    wherein the ordinary token is inserted into a token insertion slot disposed on another side opposite to a side where the support is disposed.

16. A system for managing a game, comprising:
    at least one gaming machine which reads game data from a token with built-in IC chip, and
    a server which acquires the game data being read by the gaming machine, and stores the acquired game data;
    wherein the gaming machine comprises an upward-facing recess such that the token with built-in IC chip is fitted into the recess in order to read the game data;
    wherein the upward-facing recess is provided on a support disposed next to a display device which shows progress of the game; and
    wherein an action figure is attached to the token with built-in IC chip in a detachable manner.

17. The system for managing the game according to claim 16, further comprising:
- a data comparator, which compares the read game data with pre-recorded data stored at the server; and
- a transmitter, which transmits a stop signal to the gaming machine in order to stop commencement or the progress of the game in accordance with the game data acquired by the server in a case where identification data included in the read game data is not found in the stored pre-recorded data after comparing the game data acquired by the server with the pre-recorded data stored at the server.

18. The system for managing the game according to claim 16, wherein the upward-facing recess is provided with a protrusion from a peripheral rim of the recess such that a notch provided in the token with built-in IC chip engages with the protrusion.

19. The system for managing the game according to claim 16, wherein the gaming machine also utilizes an ordinary token without a built-in IC chip such that both token with built-in IC chip and ordinary token may be paid out from respective openings.

* * * * *